(12) United States Patent
Carley et al.

(10) Patent No.: US 10,354,498 B2
(45) Date of Patent: Jul. 16, 2019

(54) COLOR BLIND FRIENDLY PICK TO LIGHT SYSTEM FOR IDENTIFYING STORAGE LOCATIONS

(71) Applicant: Amazon Technologies, Inc., Seattle, WA (US)

(72) Inventors: Paul W. Carley, Seattle, WA (US); Nathan Braid, Seattle, WA (US); Eugene Oleg Citrisky, Renton, WA (US); Alex Michael Cuneo, Seattle, WA (US); Samuel Gardner Garrett, Seattle, WA (US); Kurtis Lind, Tacoma, WA (US); Patrick Mahaney, Houston, TX (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/810,920

(22) Filed: Nov. 13, 2017

(65) Prior Publication Data
US 2019/0147710 A1    May 16, 2019

(51) Int. Cl.
*G09B 21/00*    (2006.01)
*G08B 5/36*    (2006.01)
*F21W 131/402*    (2006.01)
*H05B 33/08*    (2006.01)
*F21Y 113/10*    (2016.01)
*B65G 1/02*    (2006.01)
*F21W 111/00*    (2006.01)

(52) U.S. Cl.
CPC .................. *G08B 5/36* (2013.01); *B65G 1/02* (2013.01); *F21W 2111/00* (2013.01); *F21W 2131/402* (2013.01); *F21Y 2113/10* (2016.08); *H05B 33/0845* (2013.01)

(58) Field of Classification Search
CPC ....... G06Q 10/087; G06Q 10/08; G09B 1/008
See application file for complete search history.

*Primary Examiner* — Hongmin Fan
(74) *Attorney, Agent, or Firm* — Patterson + Sheridan, LLP

(57) ABSTRACT

Embodiments herein describe techniques for operating lighting systems which can be used by associates who are colorblind or are susceptible to optically induced seizures (e.g., photosensitive epilepsy). In one embodiment, the lighting system includes programmable light sources which permit the lighting system to use colors that a colorblind person can easily distinguish—e.g., red, blue, orange, etc. Put differently, the lighting system can choose colors which are easily distinguishable to a colorblind associate when instructing the associate to take an action. Moreover, the lighting system can pulse a light source by changing its brightness or intensity over time. The lighting system can control a maximum gradient change rate and a maximum intensity change to mitigate a risk of optical seizures when pulsing the light sources to mitigate the risk of inducing a seizure.

15 Claims, 10 Drawing Sheets

COLOR BLIND FRIENDLY PICK TO LIGHT SYSTEM FOR IDENTIFYING STORAGE LOCATIONS

BACKGROUND

Shipping packages typically involves moving the packages to different locations in a shipping warehouse in preparation for the packages being loaded onto trucks. Although some of the package movement throughout the warehouse can be automated, much of the sorting is performed by humans. For example, an item sortation machine may sort packages into different bins or containers but a worker (also referred to as an associate) in the warehouse retrieves those containers to build a pallet, place the container on a conveyor, move the container onto a forklift, and the like.

BRIEF DESCRIPTION OF DRAWINGS

Various embodiments in accordance with the present disclosure will be described with reference to the drawings, where like designations denote like elements.

DETAILED DESCRIPTION

As mentioned above, an item sortation machine may sort packages into different bins or containers. To assist the associate when identifying a full container (or to troubleshoot problems with the containers), a light can be disposed next to each of the containers. For example, when the container is ready for pick up, the light next to the container can illuminate indicating to the associate that the container is ready for retrieval. The associate can then retrieve the container and move it to another location in the warehouse. In this manner, the lights provide an efficient mechanism for communicating with the associate when a container is ready to be picked—i.e., retrieved.

Embodiments herein describe techniques for operating lighting systems which can be used by associates who are colorblind or are susceptible to optically induced seizures (e.g., photosensitive epilepsy). Associates with colorblindness have a decreased ability to see color or differences in color such as between shades of green and red. Thus, lighting systems which use red and green lights to instruct on associate to take different actions can be misinterpreted by associates with colorblindness. In one embodiment, the lighting system can include programmable light sources (e.g., programmable light-emitting diodes (LED)) which permit the lighting system to use colors which a colorblind person can easily distinguish—e.g., red, blue, orange, etc. Put differently, the lighting system can choose colors which are easily distinguishable to a colorblind associate when instructing the associate to take an action.

In one embodiment, the lighting system pulses a programmable light source by changing its brightness or intensity over time. For example, the lighting system may gradually increase the brightness of the light source over a first time period of time before decreasing the brightness of the light source over a second time period until the light source reaches its initial brightness. In one embodiment, the rate at which the light system changes the brightness of the light source, as well as the change in brightness, is controlled to mitigate the risk the light source can induce a seizure in the associate viewing the pulsing light source. For example, the lighting system may change the brightness not more once every one millisecond and limit the brightness change to not more than 5% of the previous brightness to mitigate the risk of inducing a seizure. Moreover, the lighting system may not turn the light source off completely when pulsing the light like when blinking a light (e.g., turning a light source on-off repeatedly). In this manner, the lighting system controls the rate of change as well as the percentage of the brightness changes to mitigate the risk of optically induced seizures.

Figure 1:
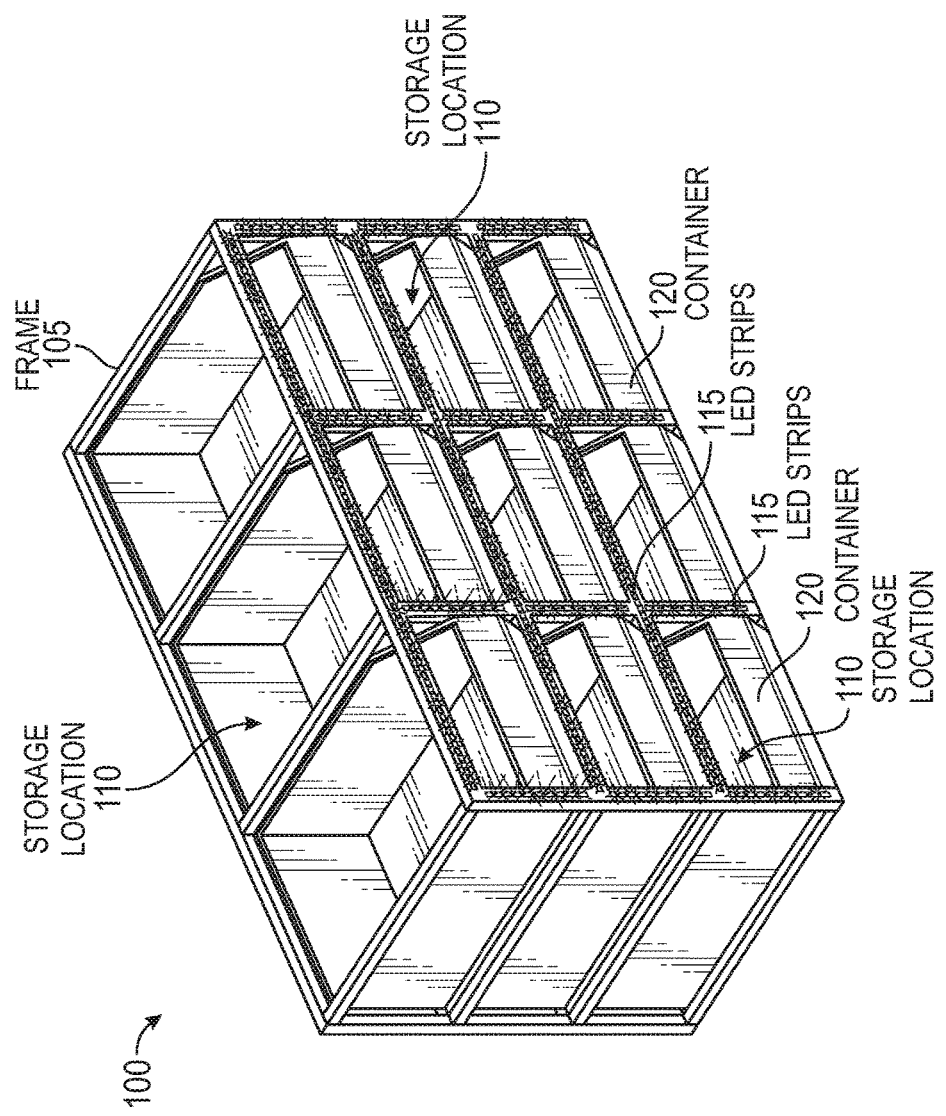
FIG. 1 is a distribution system for sorting packages into multiple containers, according to various embodiments.

FIG. 1 is a distribution system 100 for sorting packages into multiple containers 120, according to various embodiments. The distribution system 100 includes a frame 105 which defines storage locations 110 for respective containers 120. In this example, the frame 105 establishes a plurality of rows and columns arranged in a grid but in other embodiments the distributions system 100 could have only one row or only one column. Moreover, the storage locations 110 could be staggered or form any different number of patterns. In one embodiment, the containers 120 are removable from the storage locations 110. For example, when a container 120 becomes full, the distribution system 100 can use lights (e.g., individual LEDs or pixels) in the LED strips 115 to inform the associate that the container is full. The associate can then remove the container 120 and put a new empty container 120 in its place.

In one embodiment, the distribution system 100 is in a facility or warehouse (e.g., distribution facility, fulfillment center, etc.) that is logically organized into areas or regions associated with various functions. For example, after retrieving a full container 120 from the frame 105, an associate may place the container 120 on a conveyor or a hand truck for moving the container 120 to a packing area where the container 120 is loaded onto a pallet. From there, the pallet can be moved into a truck for shipping.

Although not shown, the LED strips 115 may be controlled by an inventory tracking system which records what items or packages are in each of the containers 120. In one embodiment, the inventory tracking system uses the LED strips 115 to instruct an associate to take different actions. For example, when the container 120 is full, the inventory tracking system selects one or more lights in a LED strip 115 next to the full container to illuminate a shade of blue. If there is a problem with a storage location 110 (e.g., an item was mis-sorted), the inventory tracking system may instruct the corresponding lights to illuminate a different color—e.g., red or orange. In this manner, the inventory tracking system and the LED strips 115 can assign different colors to different user actions. Moreover, the different colors may be selected such that they are distinguishable to a colorblind user. In one embodiment, the LED strips 115 are white backed LED strips (with any weather-proofing removed if used indoors). Moreover, in other embodiments LED rings or single LEDs can be used.

In addition to using different colors, the LED strips 115 may use animations to highlight a storage location 110 or instruct the associate to take an action. For example, instead of simply turning on one or more lights when indicating a container 120 is full, the lights may pulse to better capture the attention of the associate. In one embodiment, instead of blinking (e.g., turning on and then completely off over multiple iterations), the pulsing light may change brightness (e.g., increase brightness, decrease brightness, or both overtime) without turning completely off. That is, the brightness of the light may oscillate between a high intensity and low intensity at a predefined rate. Moreover, the LED strips 115 may perform more complex animations than just pulsing one or more lights. For example, using the LED strips 115 surrounding a storage locations, the LED strips 115 may control the brightness of the LEDs such that each subsequent light is gradually turned on and then off in a clockwise or counterclockwise fashion to circle the storage location 110 of interest. Furthermore, a light that is steadily on at a constant brightness (i.e., does not pulse) may indicate a different action or a different priority level than a light that is pulsing. For example, the LED strip 115 next to a full container 120 that has items scheduled to be shipped out of the warehouse in the next hour may have lights that pulse while the LED strip 115 next to a full container 120 that has items scheduled to be shipped the next day may have lights that are on, but do not pulse or blink. The associate may be trained to retrieve the containers 120 corresponding to the pulsing lights first.

In one embodiment, the pulsing lights in the LED strips 115 used to make the animations are controlled to mitigate a risk of optically induced seizures. When changing the brightness from a first intensity to a second intensity, the lights may change at discrete intensity changes spread out over time. For example, the pulsing light may increment or decrement its intensity once every 1 millisecond. Moreover, the LED strip may limit the amount the brightness or intensity changes during each discrete intensity change—e.g., a percentage of the previous intensity level. For example, if the rate at which the intensity changes is limited to once every millisecond, the intensity can change at most 5% each millisecond. However, to make the change in intensity appear more smooth to the associate, the LED strip may use a faster rate (e.g., change its intensity once every half a millisecond) but then further limit the amount the intensity can change during the half a millisecond intervals—e.g., at most a 2% change in intensity. Thus, the rate at which the intensity changes and the maximum amount the intensity can change during each step can be dependent on each other. For lighting systems where the rate at which the intensity changes is slower, greater changes in the intensity during each update or step can be increased and have the same low-risk of causing a seizure as a light system where the rate of change is faster but the change in intensity during each step is smaller. That is, because the intensity changes are spread out over a longer time period, the intensity changes can be greater than a system where the intensity changes occur more frequently. In any case, the LED strips 115 can be controlled such that changing the intensity of the light when performing an animation has a low risk of inducing a seizure.

In FIG. 1, each one of the strips 115 (and the pixels therein) is arranged on the frame 105 to establish an assigned relationship with one of the storage locations 110. For example, at least one strip 115 is disposed on a portion of the frame 105 neighboring each one of the storage locations 110. In FIG. 1, at least one pixel or LED is disposed on a portion of the frame 105 used to defined the boundaries of the storage locations 110 such that when illuminated, the associate can identify what storage location 110 corresponds to the illuminated light. Although FIG. 1 illustrates surrounding most of the storage locations 110 with the LED strips 115, in other embodiments the LED strips 115 may be disposed on only one side of the frame 105 defining the storage locations 110. For example, the associates may be taught that the illuminated lights always correspond to the storage location 110 to the right of the lights. Or the LED strips 115 may be disposed on two opposite sides of the storage locations 110 (e.g., the right and left sides or the top and bottom sides) thereby indicating the storage location 110 that is between the illuminated sides.

Although FIG. 1 illustrates disposing the LED strips 115 on a surface of the frame 105 facing the associate, in other embodiments the LED strips 115 can be mounted on surfaces of the frame 105 facing the containers 120 or the insides of the storage locations 110. Thus, when turned on, the LED strips 115 illuminate the containers 120 which may help the associate to easily identify the container 120 she should interact with. Moreover, the LED strips 115 can include diffusers to help the light to be seen by an associate who is standing in front of the storage locations 110.

In one embodiment, the containers 120 may fixed (e.g., not removable) or omitted. For example, a first associate may sort items into the storage locations 110 on a first side of the distribution 110 using the LED straps 115 while a second associate retrieves items from the storage locations 110 using second, opposite side of the distribution system 100. That is, the storage locations 110 may be open on both the first and second sides of the frame 105. Each storage location 110 may correspond to a customer order or a geographic destination. Once the first associate has sorted all the items into a first half of the storage location 110 for the order or geographic destination, the lights on the LED strips 115 can instruct the first associate to push the items through to a second half of the storage location 110. LED strips 115 disposed on the second side of the frame 105 can instruct the second associate to retrieve the items from the storage location 110 and, for example, package the items or store the items.

Figure 2:
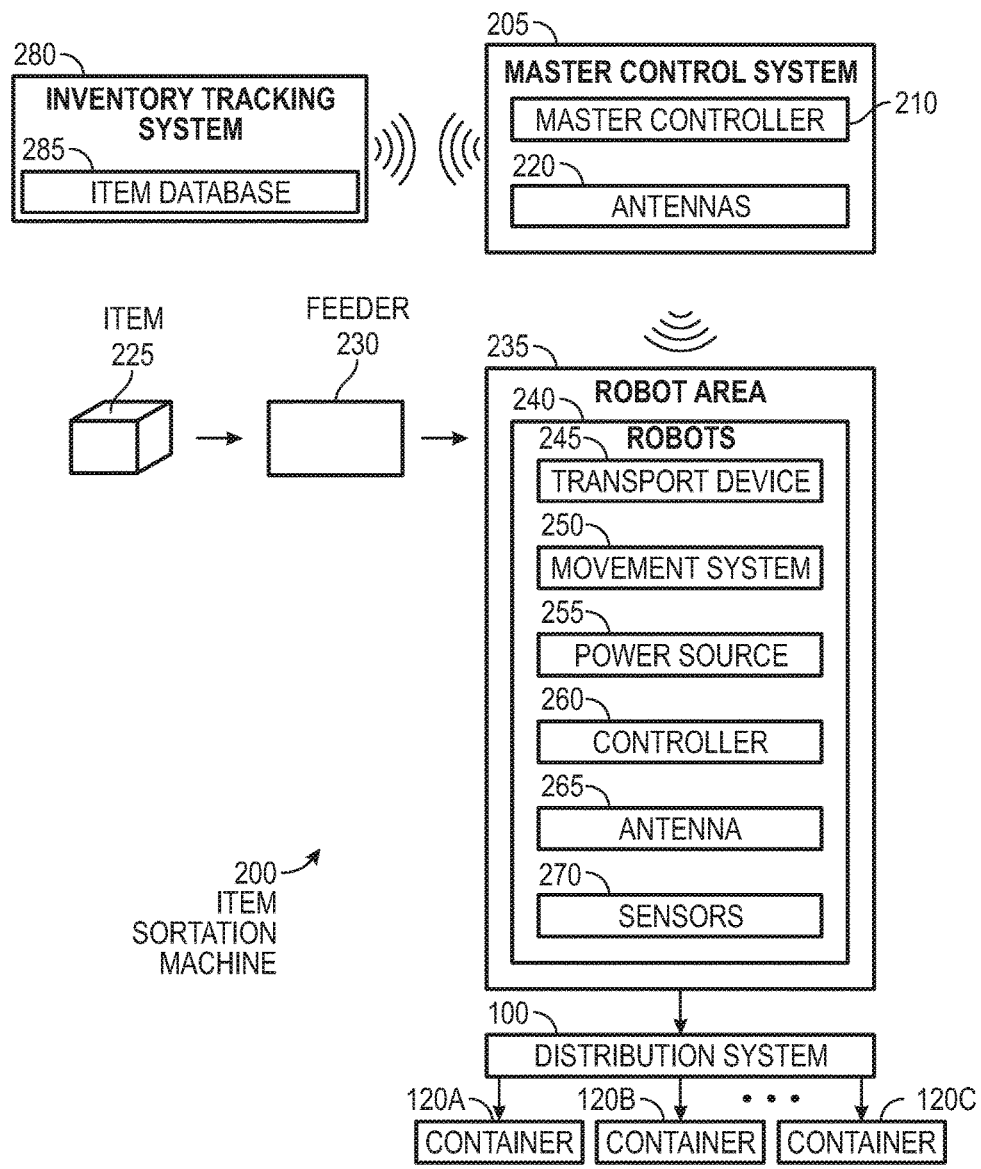
FIG. 2 is a block diagram of an item sortation machine and the distribution system, according to various embodiments.

FIG. 2 is a block diagram of an item sortation machine 200 and the distribution system 100, according to various embodiments. Generally, the machine 200 sorts received items 225 into the containers 120 in the distribution system 100 using wirelessly controlled robots 240. However, the wireless communication techniques described herein are not limited to such and can be used in any wireless controlled machine such as a machine for moving containers or racks in a warehouse, removing an item from a package, packing an item into a shipping container, picking an item, and the like. The embodiments herein can be used in any machine used to move or sort items 225 in a warehouse, sorting facility, mail processing facility, packing facility, etc. Further, the distribution system 100 does not need to be used with an automated machine but can be used by an associate for sorting items. For example, the associate may use the lights next to the containers 120 to sort the items into the containers 120, rather than relying on the machine 200.

The sortation machine 200 includes a master control system 205, a feeder 230, and a robot area 235. The master control system 205 provides the wireless control signals using a master controller 210 and antenna 220 (e.g., a transmit antenna) which control the actions of the robots 240 in the robot area 235. For example, the master control system 205 may wirelessly send move commands, pick-up commands, drop commands, stop commands, and the like which control how the robots 240 move themselves, and the item 225, in the robot area 235. Although not shown, the master control system 205 can also include a heartbeat controller which uses the antennas 220 to transmit a wireless heartbeat (or E-stop) signal to the robots 240. In one embodiment, the robots 240 perform the commands received from the master controller 210 only as long as the heartbeat signal is received. That is, if the heartbeat controller stops sending the heartbeat signal, the robots immediately stop (e.g., within a few millisecond) their current task. In one embodiment, the heartbeat signal is used to stop the robots 240 in the case of an emergency or a malfunction.

In one embodiment, the master controller 210 includes one or more processors or micro-controllers. The master controller 210 can include solely hardware and firmware or can include combinations of hardware and software elements. Although not shown, the control system 205 can include master controllers 210 for multiple different machines 200. For example, the control system 205 can refer to multiple independently operating master controllers 210 for controlling respective machines 200, synchronized master controllers 210, or a single master controller 210 which controls multiple different machines 200.

The feeder 230 is a structure that moves the item 225 into the robot area 235. For example, the robot area 235 may be an enclosure that establishes an area where the robots 240 move. The feeder 230 may be a chute which slides the item 225 into a receiving area in the robot area 235, a conveyor belt which moves the packages into the area 235, or a container in which a human places the items 225. In any case, the robots 240 can retrieve the item 225 once the item 225 arrives in the robot area 235 and use the commands received from the master control system 205 to move the item to the distribution system 100 where the item is stored in one of the containers 120.

The machine 200 can include any number of robots 240, e.g., one, two, three, four, etc. As shown, each robot 240 includes a transport device 245, a movement system 250, a power source 255, a controller 260, and at least one antenna 265. The transport device 245 permits the robot 240 to carry the item 225 to different locations in the robot area 235. For example, the robot area 235 may be a fenced off enclosure on the warehouse floor or a frame which includes tracks which the robots 240 can follow. The robots 240 can move along the floor and/or vertically using the frame. In another example, a portion of the robots 240 (or the entire robot) may remain stationary in the robot area 235. For instance, the base of the robot 240 may be anchored while an extension of the robot (e.g., a robotic arm) can move to pick up the items 225 and move them to different locations. The transport device 245 may include a claw or suction cup for lifting or picking the item 225. In another example, the transport device 245 may be a conveyor that receives the item 225 from a conveyor belt in the feeder 230. In another embodiment, the transport device 245 may be a bin in which the feeder 230 places the item 225.

The movement system 250 may move the entire robot 240 or a portion of the robot 240 within the robot area 235. For example, the movement system 250 can include wheels or bearings which permit the robot 240 to move along the floor or along tracks. In another example, the movement system 250 includes an arm attached to the transport device 245 to move the item 225. For example, the robot area 235 may include a central conveyor belt that moves received items 225 past the robots 240. The master controller 210 can instruct a selected one of the robots 240 to pick up the item 225 as it passes using the movement system 250 and the transport device 245 to place the item 225 into the distribution system 100.

The power source 255 in the robots 240 can be a battery or a capacitor. For example, the robots 240 may move relative short distances (e.g., less than 50 feet) before they return to recharge. In that case, the charge on a large capacitor (or capacitors) can be sufficient to move the robot 240 before the robot 240 returns to a charging station or rail to recharge the capacitor. The advantage of using a capacitor as the power source 255 is that it can provide high currents and recharge in a shorter time than a battery, although either is acceptable. In another example, if the entire robot 240 does not move within the robot area 235, then the robot can be connected to a power grid (e.g., plugged into a power outlet) where the power source 255 can be a power converter.

The controller 260 can be one or more processors or micro-controllers which receive commands from the master controller 210 using the antenna 265 and issues corresponding commands to the transport device 245 and movement system 250. For example, if the master controller 210 instructs the robot 240 to move the item 225 to a particular location in the robot area 235, the controller 260 in turn issues one or more commands to the movement system 250 to move the robot to the desired location. In one embodiment, in addition to receiving information from the master controller 210, the controller 260 can transmit information to the master controller 210. For example, the controller 260 may use the antenna 265 to inform the master controller 210 when a command has been completed successfully. The controller 260 may send other information wirelessly to the master controller 210 such as the charge on the power source 255, status of the transport device 245 or movement system 250 (if there is a malfunction or needs repair), if the item 225 was dropped, and the like. In one embodiment, the controller 210 may be entirely hardware, but in other embodiments may include a combination of hardware/firmware and software.

The master controller 210 can communicate with an inventory tracking system 280 using wireless or wired communication. For example, the master controller 210 may inform the inventory tracking system 280 when a command has been completed successfully (e.g., an item 125 has been placed in the container 120) or when a command has not been completed successfully. For example, using sensors on the robots 240, the master controller 210 may determine an item 225 fell off, or the robot 240 could not place an item in a container 120 due to a jam in the machine 200 or because an item 225 previously placed in the container 120 is blocking the robot 240 from placing the current item 225 into the container 120. The robot 240 could also use sensors to determine when the container 120 is full or when items 125 have been stacked above a certain height in the containers 120. The master controller 210 can forward all of this information to the inventory tracking system 280. In turn, the inventory tracking system 280 can use this information to control a lighting system on the distribution system 100 (not shown in FIG. 2) to provide instructions to an associate regarding the containers 120.

The inventory tracking system 280 can use an item database 285 to track the items 225 in the warehouse. When an item is placed in a container 120 by the item sortation machine 200, the inventory tracking system 280 can update the item database 285. In this manner, the inventory tracking system 280 can know what items are in which container 120 in the warehouse. In one embodiment, the item database 285 may maintain a virtual container that corresponds to each of the containers 120. For example, each of the containers 120 may include a unique ID (e.g., encoded into a bar code or QR code disposed on the containers 120). Each time an item 225 is placed in a physical container 120, the inventory tracking system 280 updates the virtual container in the item database 285 to indicate the item 225 is now in the corresponding physical container 120. In one embodiment, the inventory tracking system 280 can use dimensions of the items 225 being placed in the containers 120 to determine if the container is full. However, doing so does not always provide an accurate indicator since the dimensions (which can be provided by a vendor) may be wrong or the items may stack in different ways in the containers 120. Using a combination of the sensors in the robots 240 and the dimensions of the items 225 may provide a more accurate estimate when the containers 120 are full.

As mentioned above, the distribution system 100 receives the item 225 from the robot 240 and places the item 225 in one of the containers 120. The distribution system 100 may be multiple access apertures (e.g., a filing system) with corresponding chutes that lead to the containers 120. Using the transport devices 245, the robots 240 can move the items 225 through the apertures in the distribution system 100 and into the containers 120. In another example, the distribution system 100 may include fasteners or platforms for coupling the containers 120 to the distribution system 100. For instance, the distribution system 100 may form a rack or frame on which the containers 120 are mounted. The robots 240 can travel to the portion of the rack that stores the corresponding container 120 for the package and place the item 225 into the container 120.

In one embodiment, the containers 120 are assigned different destinations either within the warehouse or to an external location (e.g., a different warehouse or mailing code) as indicated by the inventory tracking system 280. Moreover, the containers 120 may correspond to different shipping companies. In one embodiment, the master controller 210 learns the desired destination of the items 225 from the inventory tracking system 280, which may be determined by scanning a bar code or reading an RFID tag on the item 225 when in the feeder 230. The master controller 210 can then provide instructions to the robots 240 to move the item 225 to the appropriate location in distribution system 100 such that the item 225 is stowed in the container 120 corresponding to its destination. In this manner, the item sortation machine 200 can provide commands to the robots 240 for sorting received items 225 into the containers 120.

Figure 3:
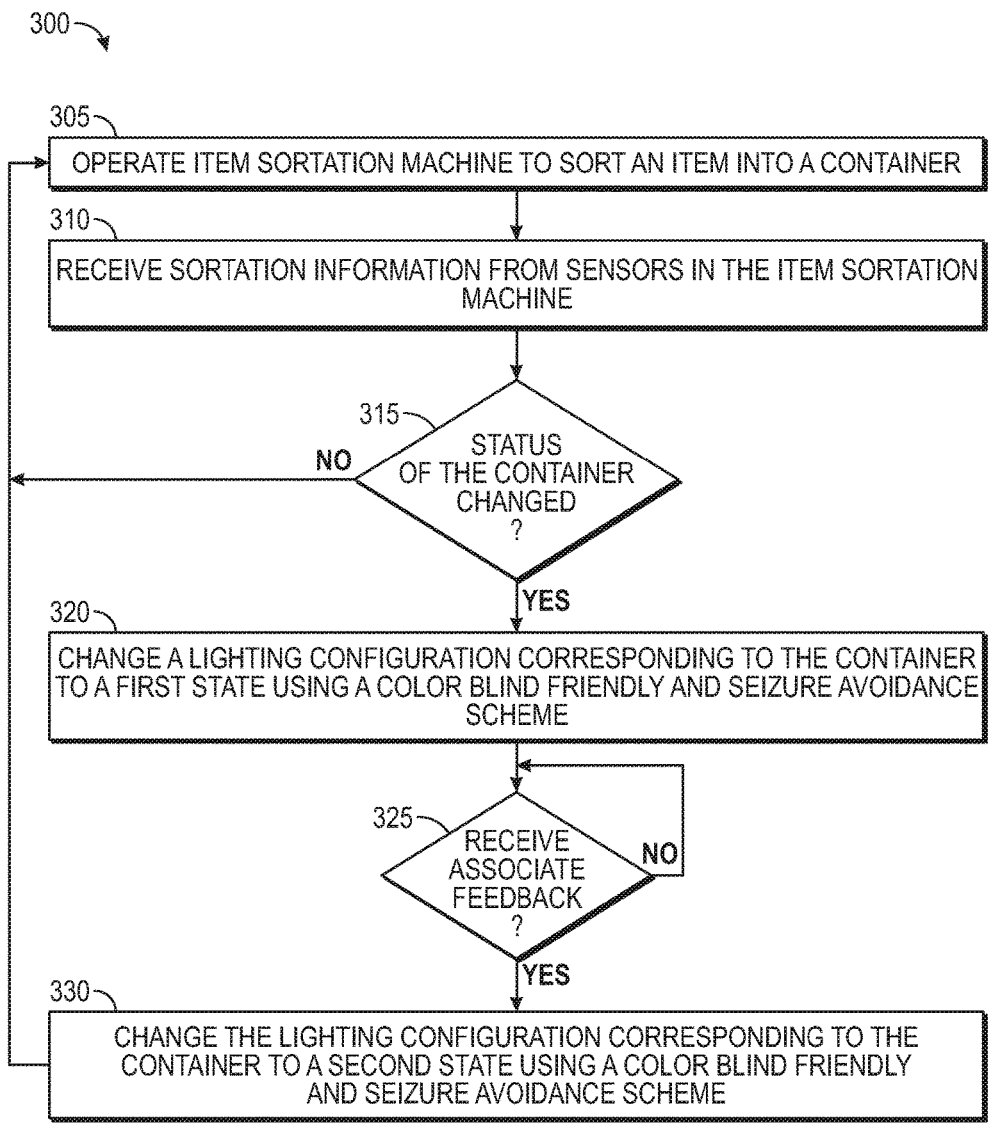
FIG. 3 is a flowchart for changing a lighting configuration corresponding to a container in the distribution system, according to various embodiments.

FIG. 3 is a flowchart of a method 300 for changing a lighting configuration corresponding to a container in the distribution system, according to various embodiments. At block 305, the item sortation machine sorts an item into a container. The item sortation machine can include robots, actuators, conveyor belts, chutes, and the like to move items into a corresponding container. In one embodiment, the item sortation machine determines where to sort the item using information received from the inventory tracking system. For example, using an ID corresponding to the item, the inventory tracking system can determine a destination for the item in the warehouse or a destination outside of the warehouse and then instruct the item sortation machine to place the item in the container corresponding to that destination.

At block 310, the inventory tracking system receives sortation information from sensors in the item sortation machine. In one embodiment, the sortation information includes whether the item was properly sorted into the container. For example, the item may have been mis-sorted (e.g., placed in the wrong container), the container may be full, the container may have another item that is blocking the item, a stowed item may have fallen out of a container, or the item may have fallen off a robot during transit. Thus, the item sortation machine can report to the inventory tracking system when an item was sorted properly, when the item was not sorted, the status of the container (e.g., full or blocked), or the status of items previously stowed in the container (e.g., an item fell out of the container).

At block 315, the inventory tracking system determines if a status of a container has changed. In one embodiment, the inventory tracking system uses the sortation information provided by the item sortation machine at block 310 to determine the status of the containers in the distribution system. For example, using this information, the inventory tracking system determines that the container includes all the items going to its destination, and thus, can be picked up. Or the inventory tracking system can determine the container is full and should be replaced with a new container. In another example, the inventory tracking system determines there is a problem with the container and an associate should be dispatched to identify and fix the problem. For instance, the robot may report that an item is blocking it from placing another item in the container, or that an item has fallen out of the container. As such, the inventory tracking system can use a variety of different statuses for the containers in the distribution system such as: not full, potentially full, ready for pickup, blocked, etc.

In one embodiment, the inventory tracking system uses internal metrics to determine whether to change the status of a container. For example, in addition to using the information provided by the item sortation machine, the inventory tracking system can use information in the item database to change the status of the containers. Because the item database tracks the items in the containers, the inventory tracking system may change the status from "not full" to "ready for pickup" if the number of items in the container exceeds a threshold. In another embodiment, the inventory tracking system can use dimensions of the items to determine if a container is full. For example, the inventory tracking system can use the dimensions of the item to calculate the volumes of the items and then compare the sum of those volumes to the volume of the container itself. If, e.g., the sum of the volumes of the items exceeds 70% (or some other predefined threshold) of the volume of the container, the inventory tracking system changes the status from "not full" to "potentially full." Because item dimensions may be unreliable, the inventory tracking system may use sensor data from the robots to determine if the container is actually full or, using later blocks in method 300, request that an associate visually view the container to determine if it is full. When the status is "potentially full," the inventory tracking system may not let the item sortation machine place more items into the container.

If the status was changed, the method 300 proceeds to block 320 where the inventory tracking system changes a lighting configuration corresponding to the container to a first state using a colorblind friendly and seizure avoidance scheme. In one embodiment, the inventory tracking system has a different lighting state for each status of the container. For example, the "not full" status has a first lighting configuration, the "potentially full" status, has a second lighting configuration, the "ready for pickup" status has a third lighting configuration, and so on. The different lighting configurations are used to control the light sources corresponding to the containers in the distribution system. For example, if the container previously had the "not full" status but changed to the "ready for pickup" status at block 315, the inventory tracking system can send an instruction to change the lighting configuration of a light source next to the container from green to blue, or from no color (e.g., the light source is turned off) to blue. An associate can see the blue light and know, based on training, that the corresponding container is ready for pickup.

The different container statuses can have different lighting configurations or can share lighting configurations. For example, the statuses "not full," "full," and "ready for pickup" may all have different lighting configurations which have different colors and/or different animations. However, other statuses can share the same lighting configurations. For example, the statuses indicating there is, or could be, a problem with the container such as "potentially full" or "blocked" can have the same lighting configuration—e.g., a pulsing red light. The lighting configuration alerts the associate who can view the container and diagnosis the problem. The associate can provide feedback to the inventory tracking system which can then change the status using the feedback (e.g., if the container is not actually full or if the associate rearranged the items in the container).

If the lighting configuration includes an animation—e.g., a pulsing light or multiple pulsing lights that illustrate motion—the changing intensities of the light or lights is controlled to avoid causing optical seizures. As mentioned above, the animations restrict how often the intensity changes, and the amount as which intensity varies each time it does change.

In one embodiment, the inventory tracking system accounts for changes between lighting configurations when preventing optical seizures. That is, when changing the lighting configurations at block 320 from the previous state to the first state, the inventory tracking system may change the states gradually to prevent seizures. For example, even if the lighting configurations do not include animations (e.g., the lights are illuminated at a constant intensity or brightness), when lights spread across the distribution system are changing states at similar times, this may be enough to induce an optical seizure. If only one light (or a group of lights) for a storage location are changing from green to blue, this may not be enough to induce a seizure even if the change in colors happens rapidly. However, the lights corresponding to multiple storage locations may change at, or near, the same time. Thus, even if these light are not using animations, an associate viewing the entire distribution system may see lights changing color every second or so (depending on how often the states change for each of the storage locations). Thus, the inventory tracking system may change the lights slowly (e.g., gradually changing the colors over a predefined time period) rather than changing the colors of the lights instantly when changing the lighting configurations.

At block 325, the inventory tracking system determines whether it receives associate feedback. As mentioned above, the different lighting configurations (and their different states) may correspond to instructions or actions for the associates such as troubleshooting a storage location, removing a full bin, replacing a fallen item, and the like. At block 325, the inventory tracking system waits for the associate to inform it when the action (or actions) corresponding to the first state has been performed. For example, the associate may use a personal handheld device (e.g., a tablet or barcode reader) or a button on the distribution system to inform the inventory tracking system when the corresponding action has been performed.

Once complete, the method 300 proceeds to block 330 where the inventory tracking system changes the lighting configuration of the lights corresponding to the container to a second state using a colorblind friendly and seizure avoidance scheme as described above. For example, if the associate indicates the container is not actually full (despite what a sensor on the item sortation machine may have reported or based on volume calculations of the items in the container), the inventory tracking system changes the lighting configuration from the state of "potentially full" to "not full." In another example, the associate may restack the items in the container so that a blocking item lies flat in the container. In response, the inventory tracking system may change the state from "blocked" to "not full" thereby permitting more items to be placed in the container and update the lighting configuration accordingly. The method 300 can then repeat so that more items can be placed in the container (or placed in a new container if the previous container was full).

Figure 4:
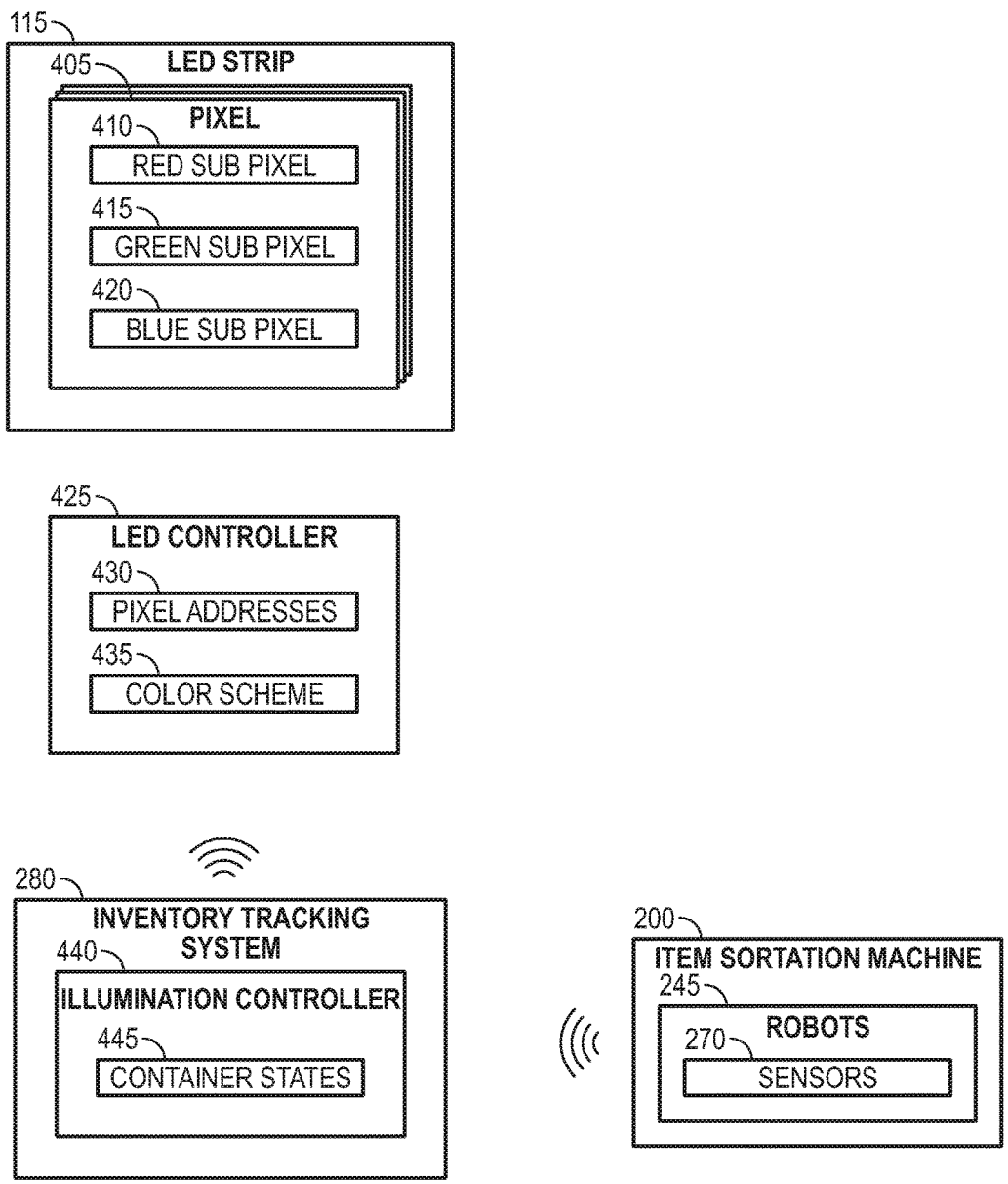
FIG. 4 is a block diagram of a control system for setting lighting configurations corresponding to containers, according to various embodiments.

FIG. 4 is a block diagram of a control system for setting lighting configurations corresponding to containers, according to various embodiments. FIG. 4 includes the LED strip 115, a LED controller 425, the inventory tracking system 280, and the item sortation machine 200. The LED strip 115 includes a plurality of pixels 405 which can be referred to as lights or light sources. In this embodiment, each pixel 405 includes independently controllable subpixels for outputting specific colors—e.g., a red subpixel 410 for outputting red light, a green subpixel 415 for outputting green light, and a blue subpixel 420 for outputting blue light. Although the pixels 405 use a red, green, blue (RGB) color scheme, any color scheme can be used which rely on additive or subtractive color mixing (e.g., cyan, magenta, yellow, and key black (CMYK).

In one embodiment, the subpixels 410, 415, and 420 are controlled using different digital signals or values to perform color mixing to output an overall color for the pixels 405. For example, to output purple for the pixel 405, the red subpixel 410 and the blue subpixel 420 are on while the green subpixel 415 is inactive. Different shades of purple (or any color) can be achieved by tuning the brightness of the individual subpixels thereby changing their contributions to the combined color of the pixel 405. By independently controlling the subpixels, the overall color of the pixel 405 can be selected from thousands or millions of different colors.

In one embodiment, the pixels 405 in the LED strip 115 are individually addressable. That is, each pixel 405 may correspond to a unique pixel address 430 to enable the LED controller 425 to set (or change) the color of each pixel 405 regardless of the color outputted by the other pixels 405 in the strip 115. Thus, the LED controller 425 can use the pixel addresses 430 to select which of the pixels 405 are changed in response to a changed status of a container.

The LED controller 425 also includes a color scheme 435 for selecting colors that are colorblind friendly. In one embodiment, the color for each pixel 405 is selected using a color value represented by X-number of bits where one third of the bits set the brightness of the red subpixel 410, one third of the bits set the brightness of the green subpixel 415, and the remaining one third of the bits set the brightness of the blue subpixel 420. For example, the LED controller 425 may use a 24-bit value to set the color of each pixel 405 where respective 8-bits of the 24-bit value are used to control each of the subpixels. The LED controller 425 can transmit an individual 24-bit value to each of the pixels 405 using the pixel addresses 430. In this manner, the LED controller 425 can individual set, and change, the colors of the pixels 405. Moreover, the LED controller 425 can transmit an intensity state of each of the pixels 405 such as SOLID (i.e., non-pulsing), PULSING, or OFF which can be used to generate animations using the pixels 405.

In one embodiment, the LED controller 425 includes hardware (e.g., an integrated circuit or micro-controller), firmware, or software. The LED controller 425 may be a micro controller disposed on the LED strip 115 which receives instructions from the inventory tracking system 280. In another embodiment, the LED controller 425 is a software application that executes in the inventory tracking system 280 or some other computing system.

The inventory tracking system 280 includes an illumination controller 440 which communicates with the LED controller 425. The illumination controller 440 uses container states 445 to provide instructions to the LED controller 425 for setting the colors of the pixels 405. Stated differently, the container states 445 stores the respective states of the containers, e.g., "not full," "potentially full," "ready for pickup," etc., thereby determining the particular lighting configuration corresponding to the containers. The illumination controller 440 updates the container states 445 using information obtained from the item sortation machine 200 (e.g., from sensors disposed on or near the containers or sensor 270 disposed on the robots 240) as well as internal metrics generated by the inventory tracking system 280 such as the number of items in the container or the occupied volume in the container. For example, using the method 300 illustrated in FIG. 3, the inventory tracking system can update the container states 445 and change the lighting configuration to provide feedback and instructions to the associate using the LED controller 425.

In one embodiment, the illumination controller 440 is a software application executing on a computing system hosting the inventory tracking system 280. In one embodiment, the inventory tracking system 280 is hosted on a computing system that is co-located in the same building or warehouse as the LED strip 115 and the distribution system on which the strip 115 is disposed. However, in other embodiments, the inventory tracking system 280 may be part of a cloud computing system which includes remote computing resources.

Figure 5:
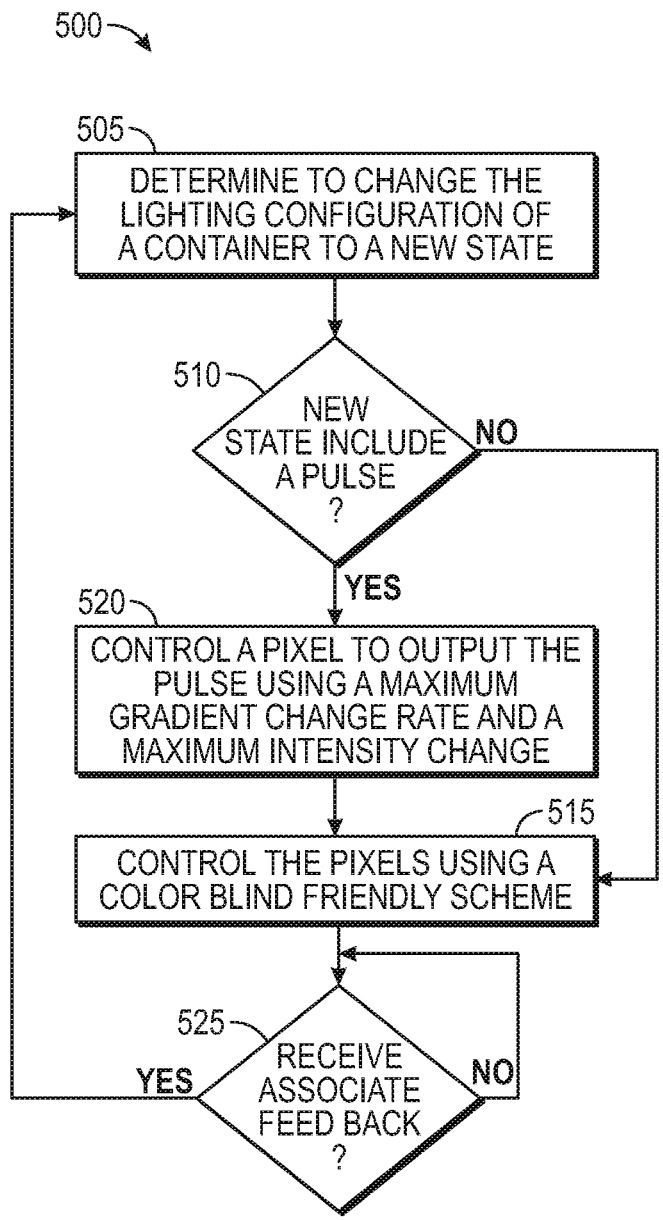
FIG. 5 is a flowchart for controlling lights using a colorblind friendly and seizure prevention scheme, according to various embodiments.

FIG. 5 is a flowchart of a method 500 for controlling lights using a colorblind friendly and seizure prevention scheme, according to various embodiments. At block 505, the illumination controller determines to change the lighting configuration of a container to a new state. That is, based on the sensors in the robot or the internal metrics generated by the inventory tracking system, the illumination controller changes the container state for one of the containers which corresponds to changing the lighting configuration corresponding to that container. For example, the illumination controller may change the state from "not full" to "ready for pickup" or from "blocked" to "not full." In either case, these states may correspond to different lighting configurations. As such, the illumination controller transmits instructions to the LED controller to update a LED strip near the container to output the changed lighting configuration.

At block 510, the LED controller 425 determines if the color scheme for the new configuration includes a pulse which may be part of an animation used to highlight the container. A pulse can include any predefined lighting configuration that causes the intensity or brightness of one of the pixels assigned to the container to change over time.

If the new lighting configuration does not include a pulse, the method 500 proceeds to block 515 where the LED controller controls the pixels using a colorblind friendly scheme. That is, the LED controller chooses colors for the lighting configuration that are easily distinguishable from colors used in the previous lighting configuration. For example, if in the previous lighting configuration the pixels outputted red, in the new lighting configuration, the color scheme may be predefined to use a color other than green—e.g., blue or orange—so that the change in the container state is readily identifiable to a colorblind associate viewing the pixel or pixels.

Although green and red are generally considered difficult to distinguish for a colorblind person, the color scheme can change the warmth or shade of these colors so that they are more easily distinguishable. For example, if the associates have already been trained that red and green mean two different states (e.g., red means the container is blocked and green means the container is not full), instead of re-training the associates, the LED controller can program the pixels to output different shares of red and green which are more readable discernable to a colorblind associate. Thus, the associates do not need to be re-trained to correlate the different colors to the container states. Outputting different shades of red and green is possible since the pixels may include different subpixels which permit the LED controller to output thousands or millions of different colors.

Figure 6A:
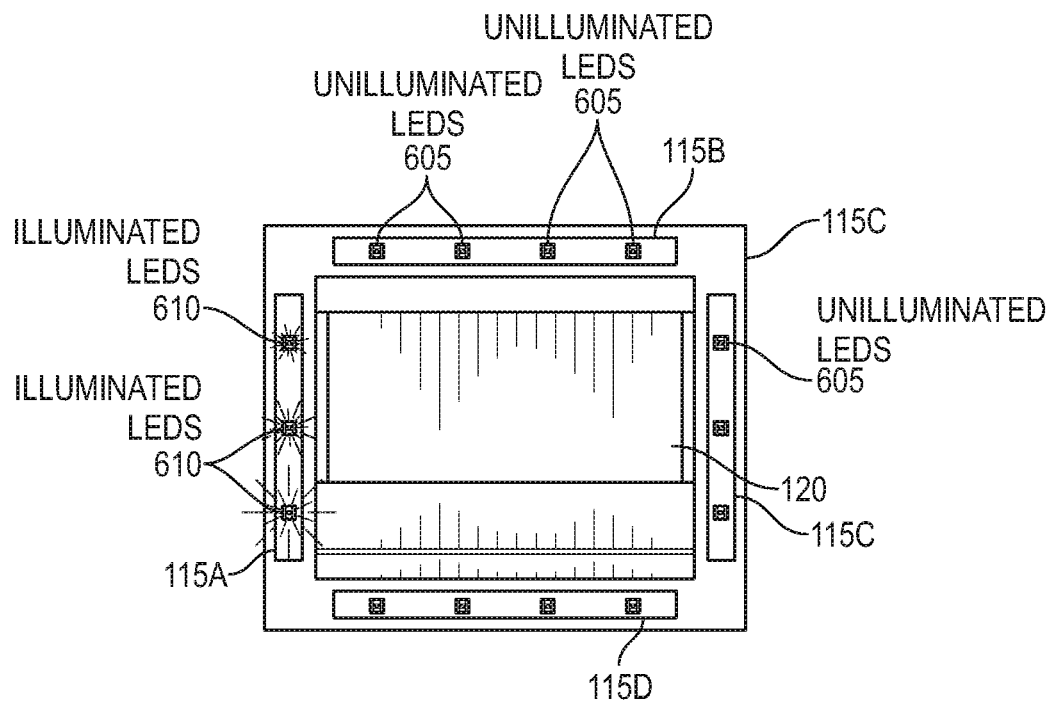
FIGS. 6A and 6B illustrate lighting configurations for identifying a container, according to various embodiments.
Figure 6B:
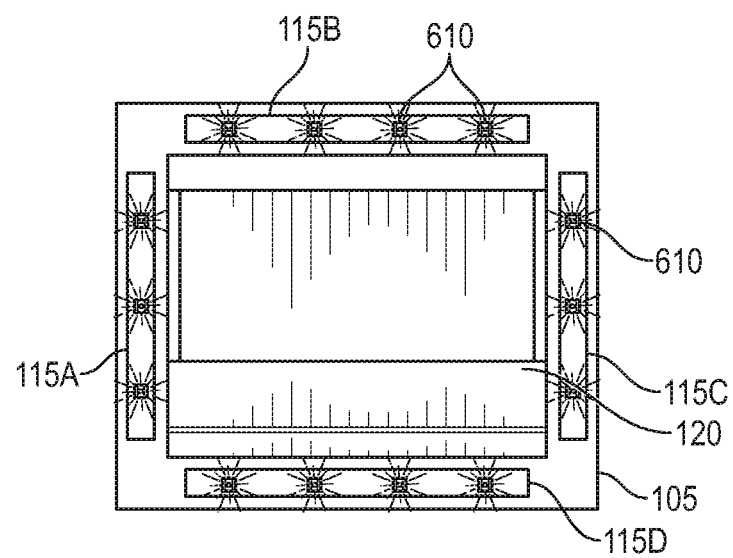

FIGS. 6A and 6B illustrate lighting configurations for identifying a container, according to various embodiments. FIG. 6A illustrates LED strips 115A-D which are disposed on the frame 105 to surround the container 120. Each of the LED strips 115A-D includes multiple LEDs (i.e., multiple pixels). In this case, only the LEDs in the strip 115A are illuminated—i.e., illuminated LEDs 610—while the other LEDs in the LED strips are unilluminated—unilluminated LEDs 605. In FIGS. 6A and 6B, it is assumed that the illuminated lights 610 are non-pulsing lights that output a constant intensity light.

In one embodiment, the illuminated LEDs 610 correspond to the state of the container 120 stored in the inventory tracking system. That is, when an associate views the LEDs 610, she can identify the state of the container 120—e.g., "full," "blocked," "potentially full," "ready for pickup," etc. The illuminated LEDs 610 can all be the same color (e.g., all blue or all green) or they can have different colors. For example, if the illuminated LEDs 610 have green and blue lights, this may indicate a different state then when those same LEDs include green and orange lights.

Moreover, the illuminated LEDs 610 can output different information. That is, the illuminated LEDs 610 can output a first color and a second color where the first color corresponds to a user action and the second color provides user feedback. For example, the top two illuminated LED 610 may be blue to indicate that the container 120 is ready for pick up (e.g., a user action); however, the bottom illuminated LED 610 may be green to inform the associate she is interacting with the correct container which is one example of providing user feedback. For instance, the LED controller may change the color of the bottom illuminated LED 115A using information provided by a computer vision system that tracks which container 120 the associate is interacting with.

Once the computer vision system determines the associate has reached for the container 120, the LED controller illuminates the bottom illuminated LED 610 to inform the associate she has grabbed the correct color. For example, when this LED 610 is green, the associate knows she has grabbed the correct container 120, but if orange, she know she has grabbed the wrong container 120. In this manner, the illuminated LEDs assigned to the container 120 may have different colors which can indicate different types of information—e.g., multiple actions the associate should take, or one user action and user feedback.

As mentioned in the method 500 of FIG. 5, the LED controller can set the color of the illuminated LEDs 610 such that the color is distinguishable by a colorblind associate from the color used when the container 120 was in the previous state. For example, if the LED controller previously instructed the illuminated LEDs 610 to output red, in the state shown in FIG. 6A, the illuminated LEDs 610 may output blue. In this manner, a colorblind associate viewing the LED strip 115A can identify that the state of the container 120 has changed.

FIG. 6B illustrates illuminating all of the LEDs in the strips 115A-D which may identifying the container 120 easier to the associate. That is, using all of the LEDs to output the color corresponding to the state of the container 120 may make it easier for an associate to determine that the state of the container 120 has changed relative to using just a portion of the LEDs surrounding the container 120 as shown in FIG. 6A. Each state may correspond to a different color or colors. That is, the illuminated LEDs 610 may all be the same color or the LED controller may use multiple colors to indicate the current state of the container 120.

Returning to method 500, if at block 510 the LED controller determines the new lighting configuration does include a pulse, the method 500 proceeds to block 520 where the LED controller controls a pixel to output the pulse using a maximum gradient change rate and a maximum intensity change.

Figure 7:
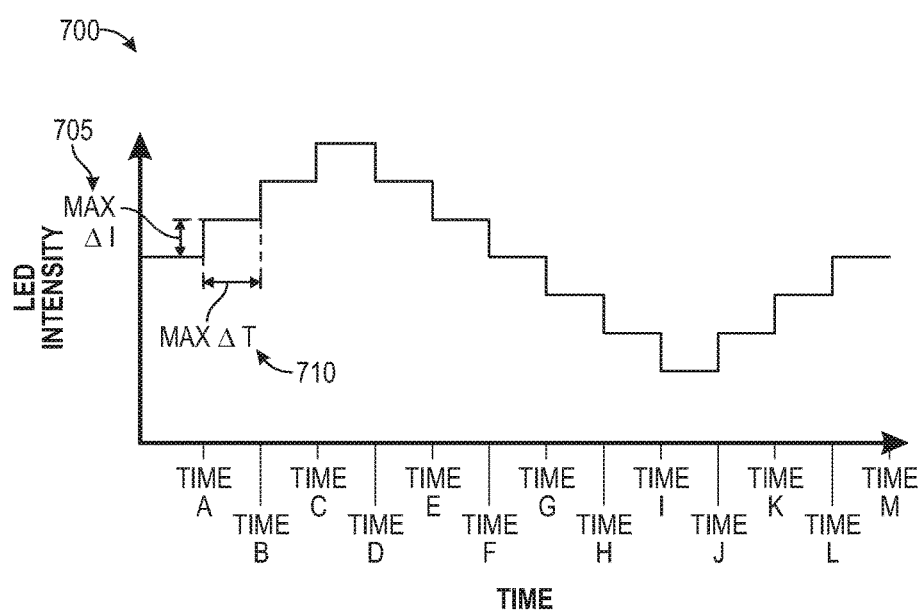
FIG. 7 is a chart for pulsing a pixel while mitigating the risk of seizures, according to various embodiments.

FIG. 7 is a chart 700 for pulsing a pixel while mitigating the risk of seizures, according to various embodiments. As shown, the chart 700 illustrates a maximum gradient change rate (i.e., a max ΔT 710) and a maximum intensity change (i.e., a max ΔI 705). In one embodiment, the max ΔT 710 illustrates the minimum amount of time that must occur between transitions (e.g., discrete intensity changes) of the LED or pixel intensity. For example, the max ΔT 710 may require that at most five LED intensity changes or transitions can occur each second. In turn, the max ΔI 705 indicates the maximum amount the LED intensity can change during any one of the transitions. For example, during the transitions that occur at Times A-M in chart 700, the LED intensity can change at most 10% from the previous LED intensity. That is, the LED intensity at Time B-C can at most be 110% of the LED intensity of the pixel at Time A-B. Similarly, the LED intensity at Time D-E may be 90% of the LED intensity of the pixel at Time C-D.

The chart 700 illustrates, the LED intensity gradually increases in a step-wise manner between Times A-C before reaching a peak LED intensity. At Times D-I, the LED intensity gradually decreases using the same constraints— i.e., the max ΔI 705 and max ΔT 710. During Times J-L, the LED intensity returns to its original intensity before Time A. In one embodiment, the Times A-M correspond to the transitions used to illustrate one pulse of the LED where the LED increases to a peak LED intensity and then decreases to a minimum LED intensity before returning to an average LED intensity. The Times A-M can be repeated any number of times to make the LED pulse continually. For example, the pulsing shown in chart 700 can be used when the state of the container is changed to "urgent" to indicate the items in the container are scheduled to be shipped out of the warehouse in the next hour. The LED controller may continue to pulse the LED or LEDs corresponding to the container until the associate provides feedback indicated she has retrieved the container from the distribution system.

Although chart 700 illustrates not turning the LED completely off when pulsing (e.g., the minimum LED intensity is non-zero), the LED controller may turn off the LED during pulsing—e.g., the LED intensity reaches zero. Moreover, in one embodiment, it may be possible to turn the LED directly from an on state (i.e., some non-zero LED intensity) to an off-state (i.e., a zero LED intensity) when pulsing rather than a gradual change in LED intensity using multiple transitions as shown in the chart 700. However, the time between the transitions from the on to off states may be longer than the max ΔT 710 illustrated in chart 700 because of the large changes in the LED intensity. That is, because the max ΔI 705 is so large when turning the LED on and off, the time between transitions may be increased to mitigate a risk the pulsing can cause an optical seizure.

Figure 8A:
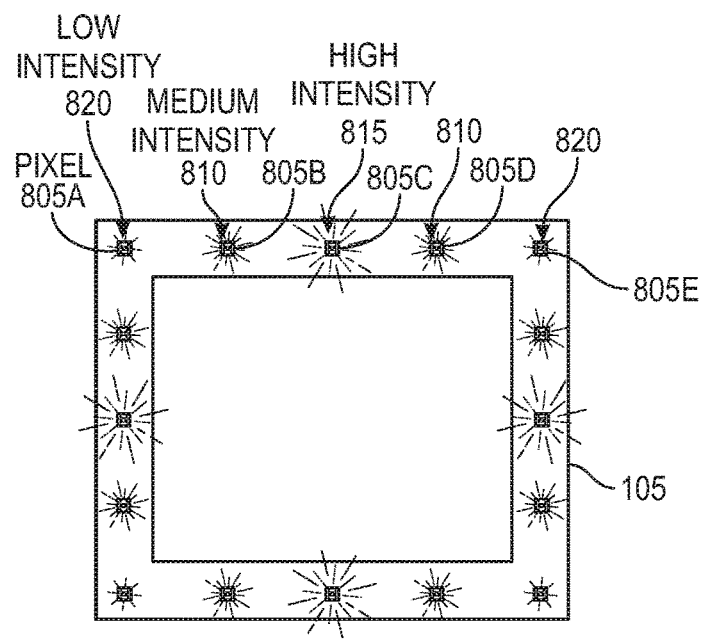
FIGS. 8A-8C illustrate pulsing multiple pixels to form an animation, according to various embodiments.
Figure 8B:
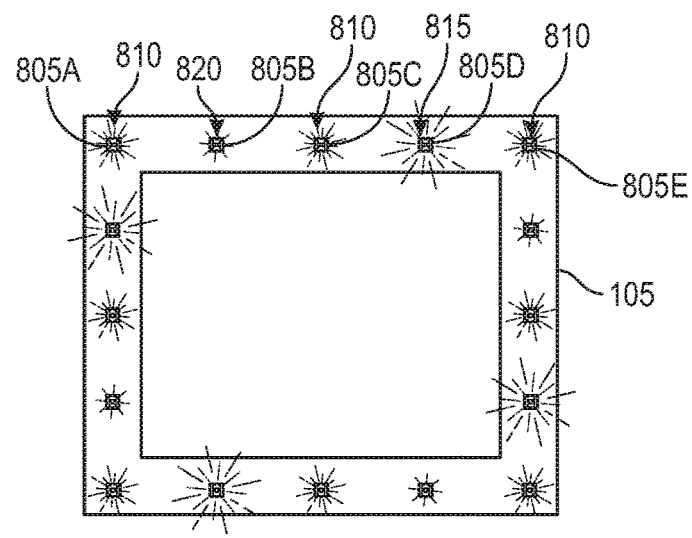
Figure 8C:
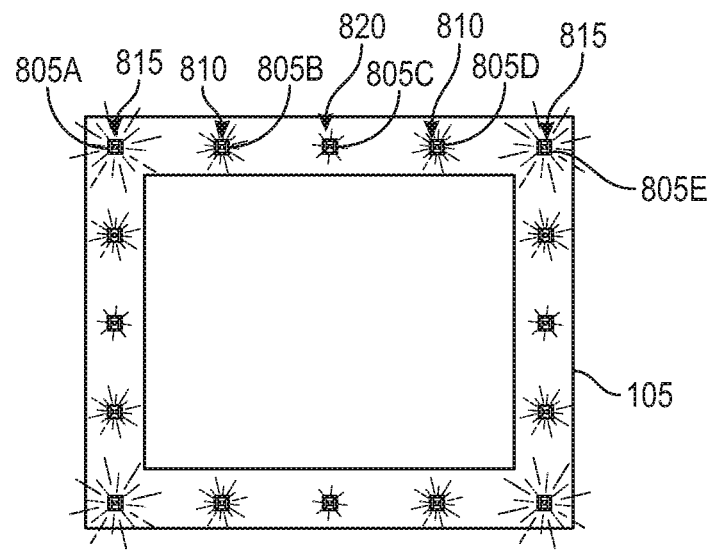

FIGS. 8A-8C illustrate pulsing multiple pixels to form an animation, according to various embodiments. In one embodiment, the animation shown in FIGS. 8A-8C is performed using the maximum gradient change rate and the maximum intensity change illustrated in the chart 700 to mitigate the risk of seizures to the associates. The FIGS. 8A-8C illustrate different sequential time periods in the animation.

FIG. 8A illustrates multiple pixels 805 surrounding a storage location in the frame 105. Moreover, FIG. 8A illustrates a first time period where the pixel 805A is at a low intensity 820, the pixel 805B is at a medium intensity 810, the pixel 805C is at a high intensity 815, the pixel 805D is at the medium intensity 810, and the pixel 805E is at the low intensity 820. This pattern then continues around the remaining pixels (not labeled) surrounding the storage location.

FIG. 8B illustrates a second, subsequent time period to the first time period in FIG. 8B where now the LED intensity for the pixel 805A is at the medium intensity 810, the pixel 805B is at the low intensity 820, the pixel 805C is at the medium intensity 810, the pixel 805D is at the high intensity 815, and the pixel 805E is at the medium intensity 810. Because the high intensity attracts the attention of the associate the most, it appears to the associate that the high intensity light has moved from the pixel 805C to the pixel 805D.

FIG. 8C illustrates a third, subsequent time period to the second time period in FIG. 8B where now the LED intensity for the pixel 805A is at the high intensity 815, the pixel 805B is at the medium intensity 810, the pixel 805C is at the low intensity 820, the pixel 805D is at the medium intensity 810, and the pixel 805E is at the high intensity 815. Thus, FIGS. 8A-8C illustrate a pattern where the intensities of the pixels 805 change from the low intensity 820, to the medium intensity 810, to the high intensity 815, and back to the medium intensity 810 and the low intensity 820. However, the intensities of the pixels 805 are staggered relative to their neighbors to provide the animation where it appears the high intensity pixels are traveling in a clockwise direction around the storage location. That is, the intensities of the pixels 805 have a fixed phase offset relative to at least one other pixel 405 such that the change in intensity of one pixel 805 trails (or leads) the change in intensity for another neighboring pixel 805. This animation may be better at capturing the attention of the associate relative to the embodiment shown in FIG. 6B where all the LEDs are one at a constant brightness. For example, the LED controller may use the animation in FIGS. 8A-8C to indicate that the container is in an "urgent" state that requires the immediate attention, while the scheme illustrated in FIG. 6B may be used when the container has a less urgent state.

Figure 9A:
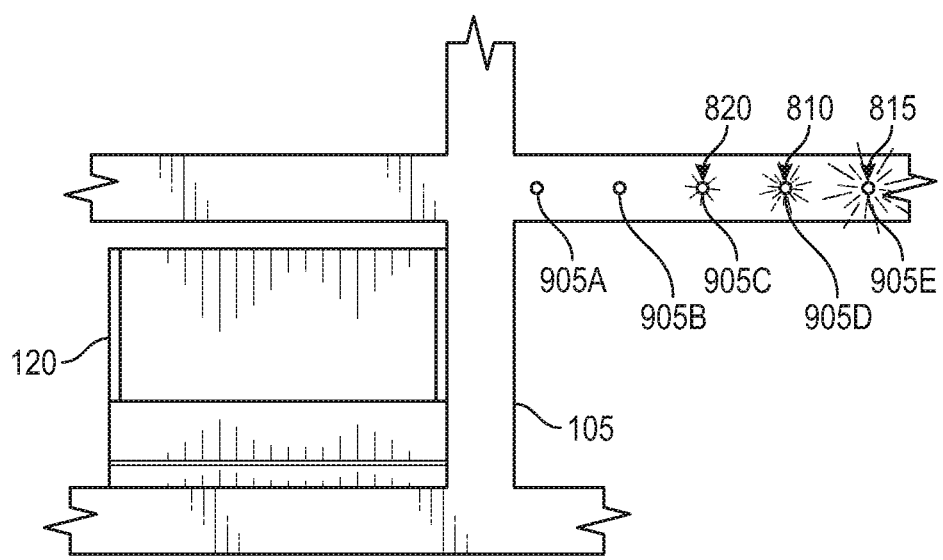
FIGS. 9A-9C illustrate pulsing multiple pixels to form an animation, according to various embodiments.
Figure 9B:
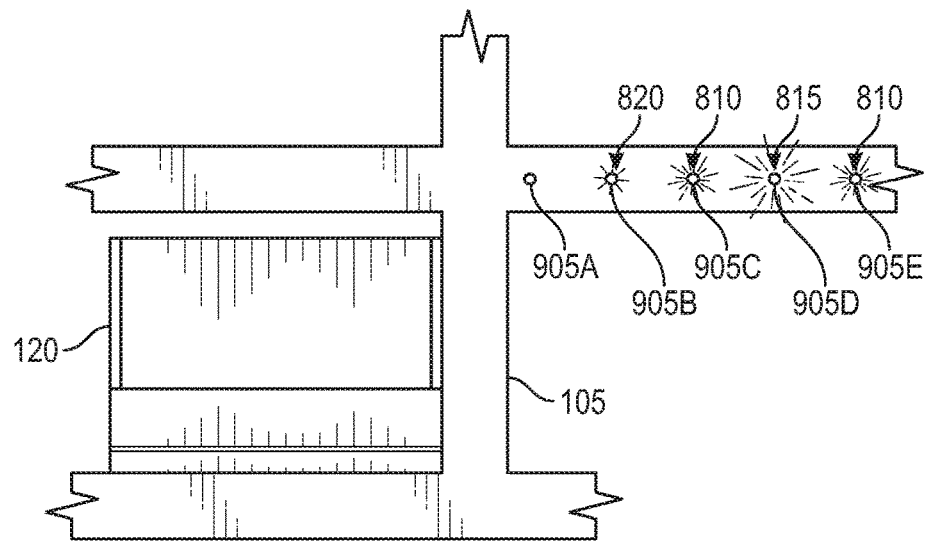
Figure 9C:
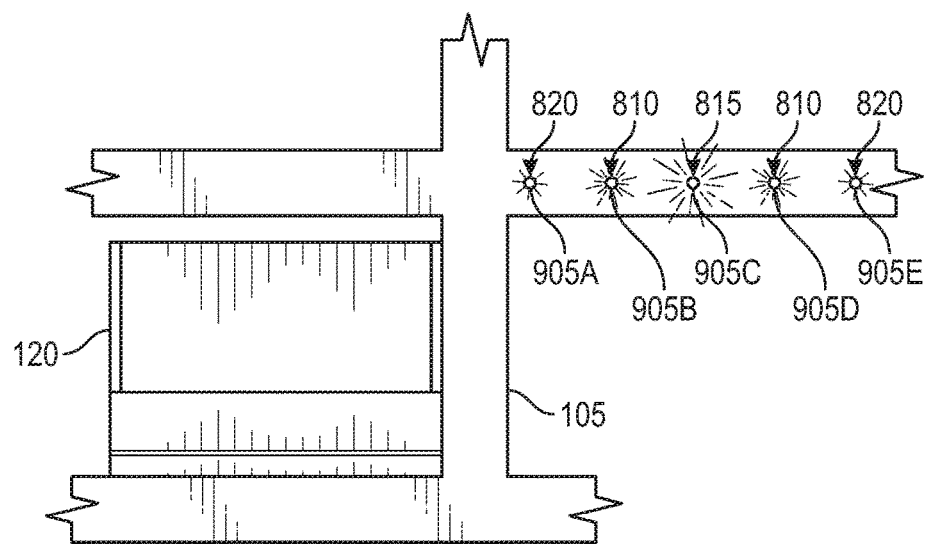

FIGS. 9A-9C illustrate pulsing multiple pixels to form an animation, according to various embodiments. In one embodiment, the animation shown in FIGS. 9A-9C is performed using the maximum gradient change rate and the maximum intensity change illustrated in the chart 700 to mitigate the risk of seizures to the associates. The FIGS. 9A-9C illustrate different sequential time periods in the animation.

FIG. 9A illustrates a portion of the frame 105 with a plurality of pixels 905A-E. In this embodiment, the LED controller adjusts the LED intensity of the pixels 905 to direct the attention of the associate to the container 120. That is, the animation points to the container 120. In the first time period illustrated by FIG. 9A, the pixels 905A and 905B are unilluminated while the pixels 905C-E are illuminated, albeit at different intensities. That is, the pixel 905C is at the low intensity 820, the pixel 905D is at the medium intensity 810, and the pixel 905E is at the high intensity 815.

FIG. 9B illustrates a second, subsequent time period to the first time period in FIG. 9A where the pixel 905E has decreased to the medium intensity 810, the pixel 905D has increased to the high intensity 815, the pixel 905C has increased to the medium intensity 810, and the pixel 905B (which was previous unilluminated) is at the low intensity 820.

FIG. 9C illustrates a third, subsequent time period to the second time period in FIG. 9B where the pixel 905E has decreased to the low intensity 820, the pixel 905D has decreased to the medium intensity 810, the pixel 905C has increased to the high intensity 815, the pixel 905B has increased to the medium intensity 810, and the pixel 905A which was previously unilluminated is at the low intensity 820. Although not shown, the pattern can continue where the pixel 905A closest to the container 120 changes to the high intensity 815 while the intensities of the other pixels 905B-E decrease—e.g., the pixel 905E may be turned off. For that point onward, the intensity of the pixels 905A-E may decrease until all the pixels all off.

Once completed, the animation may repeat where the intensity of the pixel 905E is increased first, followed by the intensity of the pixels 905D, and then followed by the intensity of the pixel 905C until the pixels are in the state shown in FIG. 9A and then repeat as described above. Because the associate is most attracted to the high intensity pixel, the animation shown in FIGS. 9A-9C moves the high intensity pixel from right to left towards the container 120 where it stops and then begins to fade. As such, this animation may be better at capturing the attention of the associate and clearly indicating the container. For example, the animation shown in FIGS. 9A-9C may be used when a container first changes states (e.g., during the first 1-5 seconds of the state change) before switching to a lighting configuration corresponding to the state. That is, this animation may be used each time a container changes state to capture the attention of the associate. The animation is then stopped and the pre-assigned lighting configuration (e.g., a constant color or another animation) is then used to indicate the action the associate should take regarding the container 120.

Returning to the method 500, in addition to controlling the pixels according to the maximum gradient change rate and the maximum intensity change, the method 500 can proceed to block 515 where the color for the pulsing light is selected to be colorblind friendly as described above. That is, the color or colors used in the animation may be selected to be distinguishable from the color or colors used during the lighting configuration for the previous state of the container.

At block 525, the inventory tracking system waits for associate feedback. In one embodiment, the inventory tracking system waits for the associate to perform an action corresponding to the new state as described at block 325 of the method 300. The method 500 can then repeat when the inventory tracking system and the LED controller change the state of the container which corresponds to a different lighting configuration.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be used to implement embodiments of the invention. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Aspects of the present disclosure are described with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A system, comprising:
   a frame defining a plurality of storage locations;
   a plurality of pixels disposed on the frame, wherein each one of the plurality of pixels is arranged on the frame to establish an assigned relationship with one of the plurality of storage locations; and
   a controller communicatively coupled to the plurality of pixels, wherein the controller is configured to:
      change a lighting configuration of a first pixel of the plurality of pixels to indicate a first state change of a first storage location of the plurality of storage locations, wherein a color of the first pixel is selected to be colorblind friendly relative to a previous color displayed by the first pixel, and wherein an intensity of the first pixel changes based on a maximum gradient change rate and a maximum intensity change to mitigate a risk of optical seizures.

2. The system of claim 1, wherein the plurality of pixels are individually addressable by the controller such that the controller can change the color of the first pixel independently from the other pixels.

3. The system of claim 1, wherein each of the plurality of pixels comprises a plurality of subpixels, wherein, to change the lighting configuration of the first pixel, the controller transmits a digital value to each of the plurality of subpixels in the first pixel, wherein a combination of light outputted by the plurality of subpixels in response to the digital values results in the color of the first pixel.

4. The system of claim 3, wherein the controller is configured to:
   change the lighting configuration of the first pixel to indicate a second state change of the first storage location by transmitting at least one different digital value to the plurality of subpixels in the first pixel relative to the digital values transmitted to indicate the first state change, wherein the color of the first pixel used to indicate the first state change is selected to be colorblind friendly relative to the color of the first pixel used to indicate the second state change.

5. The system of claim 1, wherein the controller is configured to change a lighting configuration of a second pixel of the plurality of pixels to indicate the first state change of the first storage location, wherein intensities of the first and second pixels change simultaneously to provide an animation corresponding to the first state change, and wherein a change in the intensity of the second pixel is defined by the maximum gradient change rate and the maximum intensity change to mitigate a risk of optical seizures when pulsing the first and second pixels.

6. The system of claim 5, wherein the intensity of the first pixel is different from the intensity of the second pixel when performing the animation, wherein the animation repeats so long as the first storage location remains in the state corresponding to the first state change.

7. The system of claim 5, wherein, when performing the animation, the controller is configured to gradually change the intensities of the first and second pixels from a high intensity to a low intensity, and back to the high intensity, using a plurality of discrete transitions over a defined period of time, wherein a number of the plurality of discrete transitions over the defined period of time satisfies the maximum gradient change rate.

8. The system of claim 7, wherein the low intensity is greater than zero such that the first and second pixels do not turn off during the animation.

9. The system of claim 5, wherein the animation is configured to indicate to a user viewing the plurality of storage locations a location of the first storage location in the frame, wherein the lighting configuration of the first pixel that indicates the first state change corresponds to a predefined user action.

10. The system of claim 1, wherein the controller is configured to change a lighting configuration of a second pixel of the plurality of pixels at the same time the first pixel is illuminated, wherein the color of the first pixel is different from a color of the second pixel, and wherein the color of the first pixel indicates an action that a user should take, while the color of the second pixel provides user feedback indicating whether the user is interacting with the correct storage location.

11. A method, comprising:
receiving an indication of a first state change of a first container of a plurality of containers, wherein the plurality of containers are stored in a plurality of storage locations defined by a frame, wherein a plurality of pixels are disposed on the frame, each of which is arranged to establish an assigned relationship with one of the plurality of storage locations; and
changing a lighting configuration of a first pixel of the plurality of pixels to indicate the first state change of the first container, wherein a color of the first pixel is selected to be colorblind friendly relative to a previous color displayed by the first pixel, and wherein an intensity of the first pixel is changed based on a maximum gradient change rate and a maximum intensity change to mitigate a risk of optical seizures.

12. The method of claim 11, wherein changing the lighting configuration of the first pixel comprises:
transmitting a digital value to each of a plurality of subpixels in the first pixel, wherein a combination of light outputted by the plurality of subpixels in response to the digital values results in the color of the first pixel.

13. The method of claim 12, further comprising:
changing the lighting configuration of the first pixel to indicate a second state change of the first container by transmitting at least one different digital value to the plurality of subpixels in the first pixel relative to the digital values transmitted to indicate the first state change, wherein the color of the first pixel used to indicate the first state change is selected to be colorblind friendly relative to the color of the first pixel used to indicate the second state change.

14. The method of claim 11, further comprising:
changing a lighting configuration of a second pixel of the plurality of pixels to indicate the first state change of the first container, wherein intensities of the first and second pixels change simultaneously to provide an animation corresponding to the first state change, and wherein a change in the intensity of the second pixel is defined by the maximum gradient change rate and the maximum intensity change to mitigate a risk of optical seizures when pulsing the first and second pixels.

15. The method of claim 14, wherein changing the lighting configurations of the first and second pixels comprise:
gradually changing intensities of the first and second pixels from a high intensity to a low intensity, and back to the high intensity, using a plurality of discrete transitions over a defined period of time, wherein a number of the plurality of discrete transitions over the defined period of time satisfies the maximum gradient change rate.

* * * * *